United States Patent [19]
Park

[11] Patent Number: 5,653,657
[45] Date of Patent: Aug. 5, 1997

[54] AUTOMATIC TRANSMISSION FOR A VEHICLE

[75] Inventor: Donghoon Park, Kyungki-do, Rep. of Korea

[73] Assignee: Hyundai Motor Company, Rep. of Korea

[21] Appl. No.: 550,960

[22] Filed: Oct. 31, 1995

[30] Foreign Application Priority Data

Nov. 1, 1994 [KR] Rep. of Korea ............... 94-28502

[51] Int. Cl.$^6$ .................... F16H 3/64; F16H 41/22
[52] U.S. Cl. .................... 475/45; 475/231; 475/283
[58] Field of Search .................... 475/271, 280, 475/281, 282, 283, 35, 44, 45

[56] References Cited

U.S. PATENT DOCUMENTS

| | | | |
|---|---|---|---|
| 2,593,568 | 4/1952 | Kelbel | 475/281 |
| 2,682,786 | 7/1954 | Flinn | 475/45 |
| 4,916,980 | 4/1990 | Asada et al. | 475/281 |

FOREIGN PATENT DOCUMENTS

| | | | |
|---|---|---|---|
| 5-180284 | 7/1993 | Japan | 475/282 |
| 5-187489 | 7/1993 | Japan | 485/282 |

Primary Examiner—Charles A. Marmor
Assistant Examiner—Nathan O. Jensen
Attorney, Agent, or Firm—Finnegan, Henderson, Farabow, Garrett & Dunner, L.L.P.

[57] ABSTRACT

An automatic transmission used in a vehicle for producing one of four forward speeds or a backward speed, which includes a torque converter with an impeller, turbine and stator for changing the torque speed of the power of the engine; a first planetary gear unit having a first sun gear, first planetary gear, a first planetary carrier and first ring gear; a second planetary gear unit having a second sun gear, second planetary gear, a second planetary carrier and second ring gear; a first transfer gear connected to the first planetary carrier for transferring the torque of the first planetary gear to the second ring gear; a second transfer gear connected to the second planetary carrier for transferring the torque of the second planetary gear to aid first ring gear; a first transfer shaft for transferring the torque of the turbine to the first planetary gear unit, the first planetary gear unit and first transfer gear being mounted on the first transfer shaft; a second transfer shaft for transferring the torque received from the first planetary gear unit and first transfer gear to a final gear unit connected to a differential gear; and a main reduction gear unit for making a suitable combination of the gears of the first and second planetary gear units, transfer gears, and the first and second shafts to produce one of the four forward speeds or the backward speed.

2 Claims, 3 Drawing Sheets

FIG.2

| Range | Friction Member | C1 | C2 | B2 | B3 | C3 | B1 | Engine Brake |
|---|---|---|---|---|---|---|---|---|
| D | 1 | ○ |  | ○ |  |  | ○ | ○ |
| D | 2 | ○ |  |  | ○ |  | ○ | ○ |
| D | 3 | ○ | ○ |  |  |  | ○ | ○ |
| D | 4 |  | ○ |  | ○ |  | ○ | ○ |
| R |  |  | ○ | ○ |  | ○ |  | × |

AUTOMATIC TRANSMISSION FOR A VEHICLE

BACKGROUND OF THE INVENTION

The present invention concerns an automatic transmission used in a vehicle, and more particularly the arrangement of planetary gear units in connection with friction elements worked by hydraulic pressure.

Generally the automatic transmission for a vehicle includes a transmission control unit, which automatically controls a plurality of clutches and brakes mounted in the gear train so as to work the three fundamental elements (sun gear, ring gear, planetary carrier) of the planetary gear units as the torque input or output elements, thus adjusting the final output of the transmission.

The power train of the automatic transmission must normally include a composite planetary gear device and at least five friction elements in order to produce four forward speeds and one backward speed. However to improve the shifting operation more effectively a composite planetary gear unit, seven friction elements and three one-way clutches are required. This causes a complicated construction of the power train, and increase of the weight resulting in the degradation of the fuel consumption rate.

Moreover, most of the automatic transmissions involving planetary gear units generally have the input shaft on which are mounted all of the planetary gear units and friction elements mounted on the input shaft, so that the number of parts for connecting the planetary gear units with the friction elements is increased as are length and weight of the transmission. Additionally, the lines for supplying hydraulic pressure to the friction elements are complicated as well as the lubrication lines.

SUMMARY OF THE INVENTION

It is an object of the present invention to reduce the number of the components of the transmission and thus the weight thereof.

It is another object of the present invention to reduce the length of the transmission enhancing the spatial usability in the axial direction.

It is still another object of the present invention to employ two separate shafts arranged parallel to each on which are distributively arranged the planetary gear units together with friction elements, resulting in simplification of the whole structure of the transmission.

According to an embodiment of the present invention, an automatic transmission used in a vehicle for producing one of four forward speeds or a backward speed, which comprises:

a torque converter with an impeller, turbine and stator for changing the torque speed of the power of the engine;

a first planetary gear unit having a first sun gear, first planetary gear, a first planetary carrier and first ring gear;

a second planetary gear unit having a second sun gear, second planetary gear, a second planetary carrier and second ring gear;

a first transfer gear connected to the first planetary carrier for transferring the torque of the first planetary gear to the second ring gear;

a second transfer gear connected to the second planetary carrier for transferring the torque of the second planetary gear to the first ring gear;

a first transfer shaft for transferring the torque of the turbine to the first planetary gear unit, the first planetary gear unit and first transfer gear being mounted on the first transfer shaft;

a second transfer shaft for transferring the torque received from the first planetary gear unit and first transfer gear to a final gear unit connected to a differential gear; and a main reduction gear unit for making a suitable combination of the gears of the first and second planetary gear units, transfer gears, and the first and second shafts to produce one of the four forward speeds or the backward speed.

Preferably, the main reduction gear unit is so designed that the first sun gear is connected with the first transfer shaft with the first ring gear being fixed to produce the first forward speed, the first sun gear is connected with the first transfer shaft with the second sun gear being fixed to produce the second forward speed, the first sun gear and first ring gear are connected with the first transfer shaft to produce the third forward speed, the first ring gear is connected with the first transfer shaft with the second sun gear being fixed to produce the fourth forward speed, and the first sun gear is connected with the stator with the second transfer gear being locked to fix the first ring gear to produce the backward speed.

BRIEF DESCRIPTION OF THE ATTACHED DRAWINGS

FIG. 2 is a table for showing the combination of the working elements of the inventive automatic transmission according to the shifting stages.

The present invention will now be described more specifically with reference to the drawings attached only by way of example.

DESCRIPTION OF THE PREFERRED EMBODIMENTS

Figure 1:
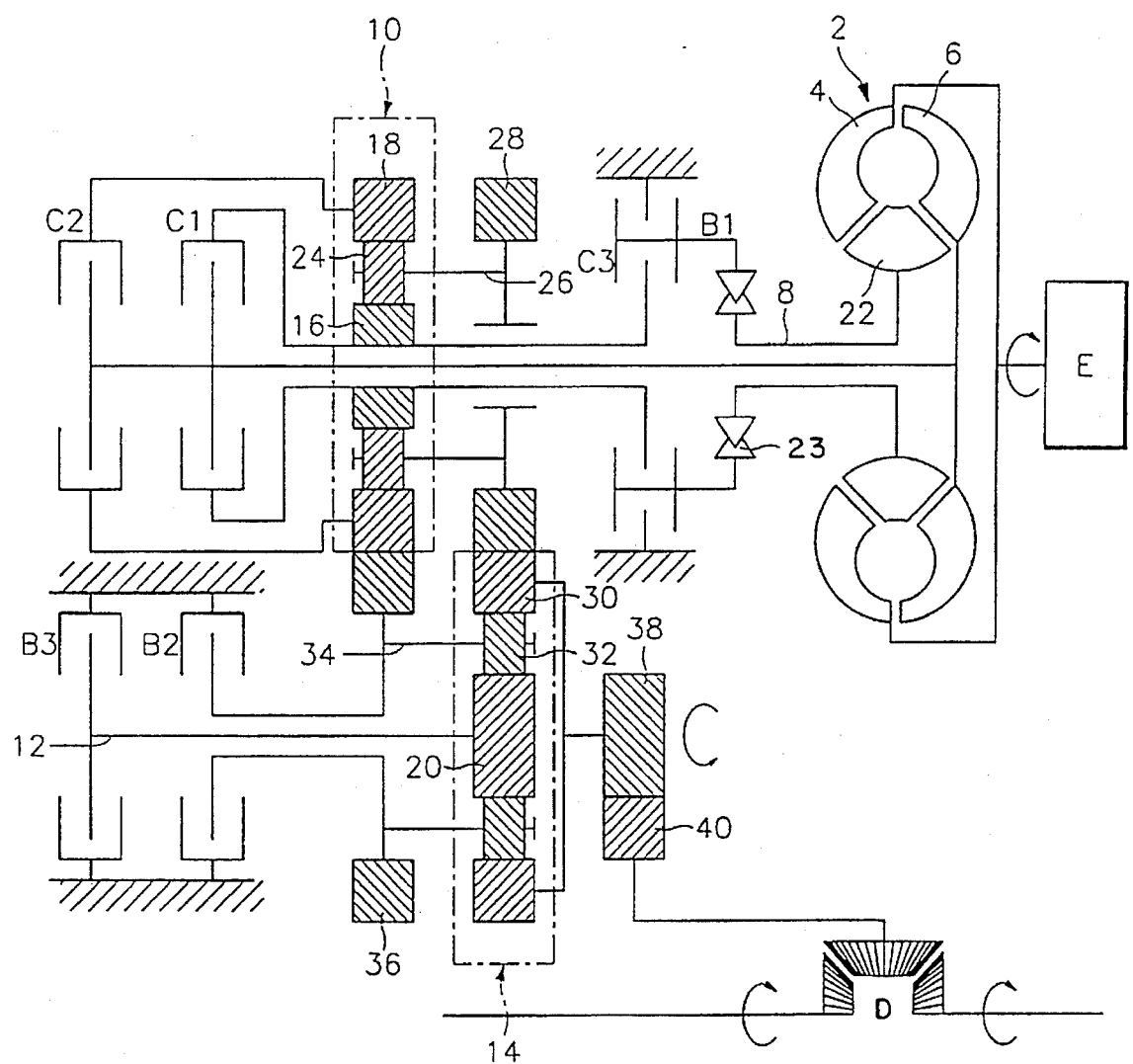
FIG. 1 is a schematic diagram for illustrating the power train of an automatic transmission according to an embodiment of the present invention.

Referring to FIG. 1, the power train of an automatic transmission according to an embodiment of the present invention includes a torque converter 2 driven by an engine E, a first transfer shaft 8 driven by the turbine 6 of the torque converter 2 arranged opposite the impeller 4, and a first planetary gear unit 10 mounted on the first transfer shaft 8. A second planetary gear unit 14 is mounted on a second transfer shaft 12. A transmission control unit controls the torque of the torque converter transferred to the first planetary gear unit 10 to the second planetary gear unit 14 and finally to a differential gear D. The first and second planetary gear units have a simple structure to allow the friction elements to be distributively mounted on the first and second transfer shafts.

Among the friction elements, a first friction element C1 is to selectively connect the torque of the turbine 6 to the first sun gear 16 of the first planetary gear unit 10 in the first, second and third forward speeds, a second friction element B1 to work in all the forward speeds, and a third friction element B2 to make the first ring gear 18 of the first planetary gear unit 10 serve as a reaction element in the first forward speed. A fourth friction element B3 is provided to selectively lock the second sun gear 20 of the second planetary gear unit 14 to serve as a reaction element when cooperating with the first and second friction elements C1 and B1. A fifth friction element C2 is provided to make the first ring gear 18 of the first planetary gear unit 10 serve as an input element, and a sixth friction element C3 to connect the stator 22 of the torque converter 2 with the first sun gear 16 of the first planetary gear unit 10 to make the first sun gear 16 serve as an input element. Additionally, a one-way clutch 23, is provided between the stator 22 and the sixth friction element C3 to transfer to the first sun gear 16 a reverse rotational force of the direction opposite to that of the engine, which transfer is achieved with locking the turbine 6 of the torque converter 2 that is accomplished by working the third and fifth friction elements B2 and C2 to lock the first ring gear 18.

The first planetary gear 24 of the first planetary gear unit 10 transfers the torque through the first planetary carrier 26 to a first transfer gear 28, which is engaged with the second ring gear 30 of the second planetary gear unit 14. The second planetary gear 32 engaged between the second sun gear 20 and the second ring gear 30 is connected via the second planetary carrier 34 to a second transfer gear 36 engaged with the first ring gear 18. The second ring gear 30 transfers the torque through a drum and a final reduction drive gear 38 to a final driven gear 40 connected with the differential gear D.

The gear shift operation of each shift stage will now be described with reference to FIGS. 2 and 3 as follows:

The First Forward Speed in "D" Range

In the first forward speed the first and third friction elements C1 and B2 are worked to make the first sun gear 16 serve as an input element and the first ring gear 18 as a reaction element. Accordingly, the power of the engine E is transmitted through the impeller 4 and turbine 6 of the torque converter 2 to the first shaft 8 to the first sun gear 16 of the first planetary gear unit 10. In this case, the first ring gear 18 of the first planetary gear unit 10 is fixed by means of the third friction element B2, which locks the second transfer gear 36 engaged with the first ring gear 18. The torque of the stator 22 is prevented from being transferred by working the second friction element B1. Thus, the torque transferred to the first sungear 16 is transferred through the first planetary carrier 26 to the first transfer gear 28 engaged with the second ring gear 30 of the second planetary gear unit 14, producing the first forward speed.

Figure 3:
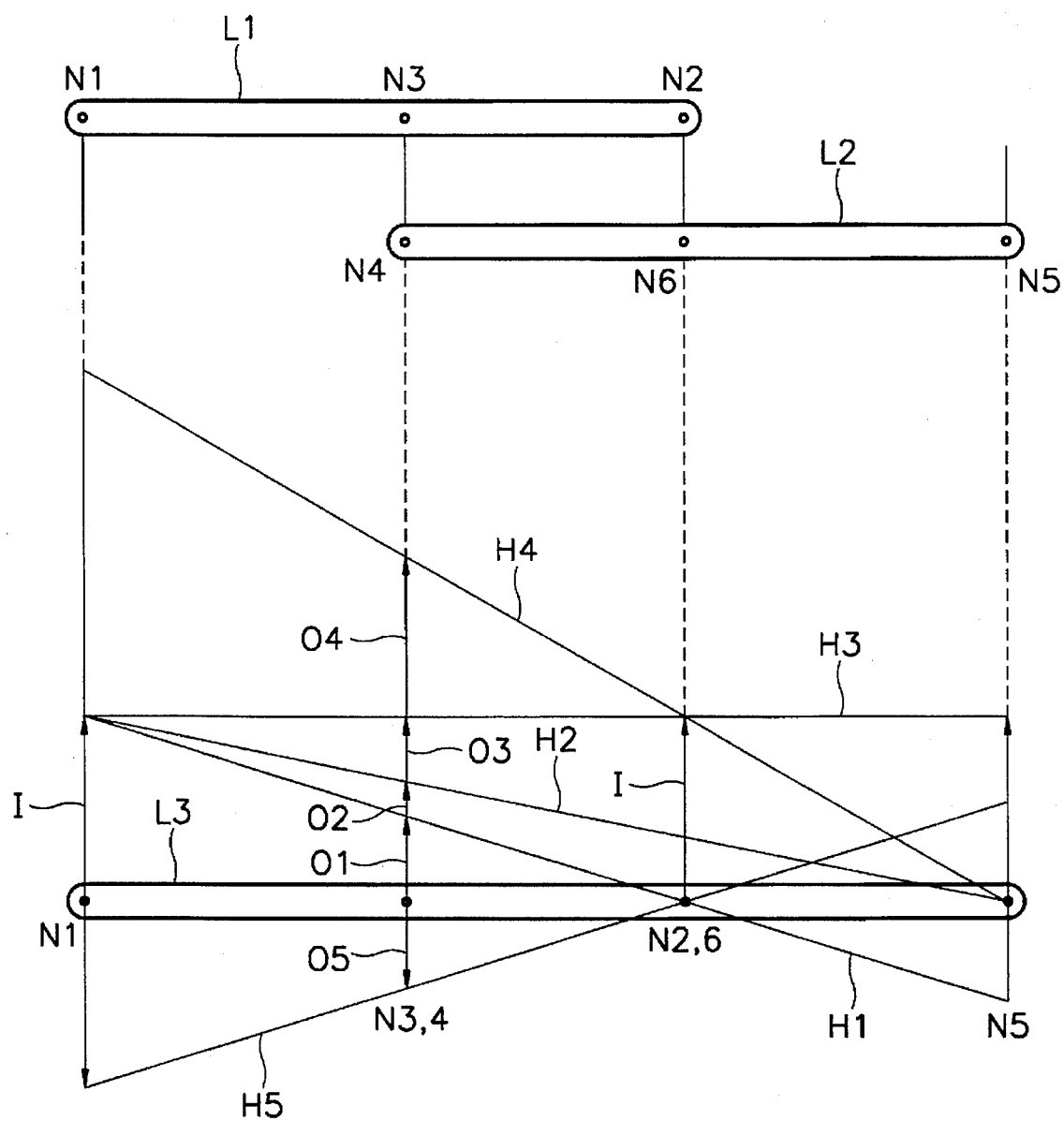
FIG. 3 is a schematic diagram for illustrating the speed rates of the inventive automatic transmission by means of lever analogy.

With reference to FIG. 3, the gear ratios may be described in lever analogy. It is assumed that the left end of a first lever L1 is the first node N1 consisting of the first sun gear 16, the right end the second node N2 consisting of the first ring gear 18, and a position between the two nodes the third node N3 consisting of the first planetary gear 24. Then, the distance between the first and third nodes N1 and N3 may be defined as the number of the teeth of the first ring gear 18, and the distance between the third and second nodes N3 and N2 as the number of the teeth of the first sun gear 16. Also assumed is that the left end of a second lever L2 is the fourth node N4 consisting of the second ring gear 30, the right end the fifth node N5 consisting of the second sun gear 20, and a position between the two nodes the sixth node N6 consisting of the second planetary gear 32. Accordingly, the distance between the fourth and sixth nodes N4 and N6 may be defined as the number of the teeth of the second sun gear 20, and the distance between the sixth and fifth nodes N6 and N5 as the number of the teeth of the second ring gear 30.

For the sake of convenience, the two levers L1 and L2 may be visualized as a single lever L3 with four nodes, which represent the first node N1, third-fourth node N3,4, second- sixth node N2,6, and fifth node N5. Describing the first shift ratio by using the conceptual lever L3, there is firstly made from the first node N1 consisting of the first sun gear 16 a vertically upward first input line I, which represents a torque with the same direction as that of the engine. Meanwhile, the second-sixth node N2,6 representing the first ring gear 18 and the second planetary carrier 32 is fixed to serve as a reaction element. Then, a straight reference line H1 is made from the top of the first input line I to the point of the second-sixth node N2,6. In addition, if a vertically upward straight line is made from the third-fourth node N3,4 representing the second ring gear 30, which in this case serves as an output device, there is obtained an output line O1 representing the first shift ratio, whose length is defined as the distance between the third-fourth node and the intersection of the line H1 and the upward straight line.

The Second Forward Speed in "D" Range

In this shift stage, the first and fourth friction elements C1 and B3 are worked making the first sun gear 16 serve as an input element and the second sun gear 20 as a reaction element. Namely, the torque of the first shaft 8 is transmitted to the first sun gear 16 by means of the first friction element Cl, while the second sun gear 20 is fixed by means of the fourth friction element B3. The torque transmitted to the first sun gear 16 is reduced by the first planetary carrier 26 transferred through the first transfer gear 28 to the second ring gear 30 of the second planetary gear unit 14. However, a part of the torque of the second ring gear 30 is fed back to the first planetary gear unit 10 through the second planetary carrier 34, thus adding to the torque of the first planetary carrier 26. Hence, the second ring gear 30 gives an output greater than in the first forward speed.

Analyzing this shift stage by employing the lever analogy with reference to FIG. 3, another straight reference line H2 is drawn to connect the top of the input line I with the fifth node N5 representing the second sun gear 20, which is fixed to serve as a reaction element. Then, a vertical line is drawn from the third-fourth node N3,4 representing the second ring gear 30 to the reference line H2, giving an output line O2 with a length greater than the output line O1.

The Third Forward Speed in "D" Range

In this shift stage, the first and fifth friction elements C1 and C2 are worked making the first sun gear and ring gear 16 and 18 simultaneously serve as input elements, so that the first planetary gear unit 10 is locked causing the input torque to be the same as the output torque. Accordingly, all the gears of the first shaft 8 rotate at the same speed, and so all the gears of the second shaft 12. This effect may be achieved by designing all of the first ring gear 18, first transfer gear 28, second transfer gear 36 and second ring gear 30 to have the same number of teeth.

Analyzing this shift stage by employing the lever analogy with reference to FIG. 3, a second input line is drawn from the second-sixth node N2,6 representing the first ring gear 18, having the same magnitude as the first input line. A reference line H3 connecting the tops of the two input lines gives an output line O3.

The Fourth Forward Speed in "D" Range

In this shift stage, the first friction element C1 is released to stop the working that has been done through the first, second and third forward speeds, but the fifth friction element C2 is worked making the first ring gear 18 serve as an input element, and the fourth friction element B3 is worked to fix the second sun gear 20 to serve as a reaction element. Accordingly, the torque of the first ring gear 18 is transmitted through the second transfer gear 36 to the second planetary carrier 34 of the second planetary gear unit 14. Then, the torque transferred to the second planetary carrier 34 becomes enhanced through the second ring gear 30, thus producing the fourth forward speed.

Analyzing this shift stage by employing the lever analogy with reference to FIG. 3, a straight reference line H4 is drawn connecting the top of the second input line representing the first ring gear 18 and the fifth node N5 representing the second sun gear 20. Then, the line connecting the third-fourth node N3,4 and the reference line H4 represents the output line O4 of the fourth speed.

The Backward Speed Range "R"

In this shift stage, the third, fifth and sixth friction elements B2, C2 and C3 are worked making the first ring gear 18 serve as a reaction element and the first sun gear 16 as the input element. Although the mechanism for achieving this shift stage is similar to that in the first forward speed in "D" range, it requires the second friction element B1 to be released and the sixth friction element C3 to connect the stator 22 with the first sun gear 16. Meanwhile, the third friction element B2 is worked to lock the second transfer gear 36 engaged with the first ring gear 18, which in turn is held by the fifth friction element C2 directly connecting with and thus fixing the turbine 6 of the torque converter 2. Hence, this stage has the same shift ratio as the stage of the first forward speed but having the opposite rotational direction so as to move the vehicle backward.

Likewise analyzing this shift stage by employing the lever analogy with reference to FIG. 3, the input line is drawn vertically downward from the first node N1 representing the first sun gear 16. Then, if a straight reference line H5 is drawn connecting the top of the input line and the second-sixth node N2,6 representing the second planetary carrier 34, there is obtained the reverse output line O5.

Thus, the friction elements are distributed over the two separate shafts, and the peripheries of the ring gears of the planetary gear units serve as the transfer gears for transferring the action or reaction, so that the whole structure of the transmission is simplified as well as reduction of the weight. Also no additional gear is needed to produce the backward speed because the backward speed is obtained directly from the stator. Hence, the length of the transmission is reduced securing much available room in the direction of the shafts, so that the inventive transmission may be suitably installed especially in the vehicles of the front wheel drive type.

What is claimed is:

1. An automatic transmission used in a vehicle for producing one of four forward speeds or a backward speed, comprising:

a torque converter with an impeller, turbine and stator for changing the torque speed of the power of the engine;

a first planetary gear unit having a first sun gear, first planetary gear, a first planetary carrier and first ring gear;

a second planetary gear unit having a second sun gear, second planetary gear, a second planetary carrier and second ring gear;

a first transfer gear connected to said first planetary carrier for transferring the torque of said first planetary gear to said second ring gear;

a second transfer gear connected to said second planetary carrier for transferring the torque of said second planetary gear to said first ring gear;

a first transfer shaft for transferring the torque of said turbine to said first planetary gear unit, said first planetary gear unit and first transfer gear being mounted on said first transfer shaft;

a second transfer shaft for transferring the torque received from said first planetary gear unit and first transfer gear to a final gear unit connected to a differential gear; and a main reduction gear unit for making a suitable combination of the gears of said first and second planetary gear units, transfer gears, and said first and second shafts to produce one of said four forward speeds or said backward speed, wherein said main reduction gear unit is so designed that said first sun gear is connected with said first transfer shaft with said first ring gear being fixed to produce the first forward speed, said first sun gear is connected with said first transfer shaft with said second sun gear being fixed to produce the second forward speed, said first sun gear and first ring gear are connected with said first transfer shaft to produce the third forward speed, said first ring gear is connected with said first transfer shaft with said second sun gear being fixed to produce the fourth forward speed, and said first sun gear is connected with said stator with said second transfer gear being locked to fix said first ring gear to produce the backward speed.

2. An automatic transmission as defined in claim 1, wherein said main reduction gear unit comprises a first friction element for connecting said first sun gear with said first transfer shaft to make said first sun gear serve as an input element in the first, second and third forward speed, a second friction element for severing the connection between said stator and said first sun gear in said four forward speeds, a third friction element for locking said second transfer gear to fix said first ring gear to serve as a reaction element in said first forward speed and said backward speed, a fourth friction element for locking said second sun gear to serve as a reaction element in said second and fourth speeds, a fifth friction element for connecting said first ring gear with said first transfer shaft to make said first ring gear serve as an input element in said third and fourth forward speed and said backward speed, a sixth friction element for connecting said first sun gear with said stator to make said first sun gear receive the torque having the rotational direction opposite to that of said engine in said backward speed, and a one-way clutch provided between said sixth friction element and said stator for producing the reverse torque applied to said first sun gear.

* * * * *